United States Patent Office
3,720,699
Patented Mar. 13, 1973

3,720,699
ACYLOXY ENDBLOCKED 3-γ - ACYLAMIDO-
PROPYL OR 3-γ-HALOACYLAMIDOPROPYL
TRISILOXANES AND PROCESS
Darrel D. Stoddard, Santa Monica, Calif., assignor to
The Sierracin Corporation, Sylmar, Calif.
No Drawing. Filed Nov. 19, 1969, Ser. No. 878,187
Int. Cl. C07f 7/10, 7/18
U.S. Cl. 260—448.8 R          10 Claims

ABSTRACT OF THE DISCLOSURE

Protective cross-linked polysiloxane coatings for normally vulnerable substrates are prepared by curing linear polysiloxane polymers comprised of the hydrolysis-condensation reaction product of a siloxane having the formula

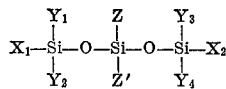

wherein $X_1$ and $X_2$ are acyloxy and $Y_{1-4}$, $Z$ and $Z'$ are independently selected from the group consisting of hydrogen, $C_1$–$C_4$ alkyl, $C_1$–$C_4$ alkoxy, phenyl, $C_7$–$C_{10}$ alkylphenyloxy, phenyloxy and

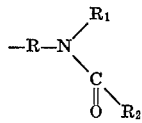

e.g., gamma-acetamidopropyl. The siloxane can be prepared, e.g., by reacting two molar proportions of a di-acyloxy silane with about one molar proportion of a di-, tri-, or tetra-alkoxy silane.

BACKGROUND OF THE INVENTION

Of recent years, organo-silicone coatings have gained widespread popularity as coatings for substrate materials normally vulnerable to chemical or mechanical attack. Polycarbonate plastics and acrylic plastics such as polymethyl methacrylate and stretched polymethyl methacrylate are typical materials which have benefitted from organo-silicone coating. With transparent substrates, such coatings are employed to enhance scratch resistance and solvent resistance of the substrate, whereupon the appearance and light-transmissive properties of such substrates are preserved against abrasion and solvent attack. Even where light transmission is not critical, as where paint or other solvent-borne opaque material is applied to the surface, organo-silicone coating preserves the structural integrity of the substrate against solvent attack pending evaporative removal of solvent from the coated surface.

FIELD OF THE INVENTION

This invention relates to a method and means of polysiloxane-coating vulnerable substrates, e.g., glass and plastic, as well as to intermediate products capable of use in such coating and to the process of preparing them.

One object of this invention is to provide a novel manner and means of polysiloxane-coating substrate materials to enhance their scratch-resistance and resistance to solvent, oxidative, and corrosive attack.

Another object of the invention is to provide polysiloxane-coating compositions which form cross-linkable polysiloxanes upon hydrolysis either before or after application to substrate materials.

Yet another object of the invention is to provide polysiloxanes which cross-link at elevated temperatures to form durable transparent protective coatings.

These and other objects of the invention will become apparent from the summary and detailed description of the invention which follows.

BRIEF SUMMARY OF THE INVENTION

According to this invention, there are provided hard, transparent, solvent resistant coatings resulting from cure at elevated temperatures of polysiloxane resins formed by the condensation of reactive silanol terminals on hydroxy di-terminated siloxanes. These hydroxy-terminated siloxanes are hydrolysis products of siloxanes produced by the condensation of acyloxy silanes with alkoxy silanes, with consequent elimination of an ester. They can also be prepared by reacting acyloxy silanes with dihydroxy or hydroxy-alkoxy silanes, as is more particularly described hereinafter.

DETAILED DESCRIPTION OF THE INVENTION

The key to the present invention involves, inter alia, the production and subsequent reaction of what may be referred to as a "five-member" siloxane chain and which can be represented by the following structure:

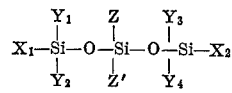

wherein $X_1$ and $X_2$ are acyloxy radicals having from 1 to 4 carbon atoms (i.e., $C_1$–$C_4$ acyloxy) and where at least one of $Y_1$–$Y_4$, $Z$ and $Z'$ is a radical subject to condensation with another radical, as by hydrolysis of an alkoxy radical to form hydroxyl with elimination of alcohol followed by hydroxyl condensation with water elimination, etc. Condensation of the radicals other than $X_1$ and $X_2$ above concerns the cross-linking of the penultimate polysiloxane and is discussed hereinafter.

The "five-member" structure is prepared by the reaction of two moles of a first reactant which contributes the outer silicons with one mole of a second reactant contributing the inner silicon. In any case, the Si—O—Si bonds are formed by condensation with elimination of relatively volatile byproduct ester and/or organic acid. In most instances the outer silicons of the "five-member" structure will be contributed by the same reactant, and the structure can usually be more simply represented as:

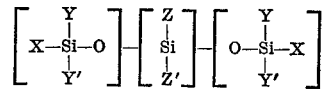

wherein the brackets denote from left to right the residuums of the first, second, and first reactants respectively. The acyloxy radicals X are readily hydrolyzed to reactive hydroxyl radicals which condense to propagate a chain comprised of "five-member" links.

The said first reactant contributing an outer silicon of the "five-member" structure is a di-acyloxy silane wherein valences of the silane unoccupied by acyloxy radicals are satisfied by independent selection from the group consisting of hydrogen, $C_1$–$C_4$ alkoxy, $C_1$–$C_4$ alkyl, $C_7$–$C_{10}$ alkylphenyloxy, phenyloxy, or phenyl, and also by

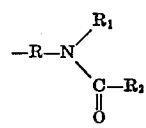

wherein R is $C_1$–$C_4$ alkylene, $R_2$ is halogen substituted or unsubstituted $C_1$–$C_4$ alkyl, and $R_1$ is independently $R_2$ or hydrogen. The acyloxy portions of the silane are such as to yield upon condensation with the said second reactant byproducts boiling below about 180° C., e.g., $C_1$–$C_4$ acyloxy, so as to facilitate byproduct removal.

When used herein and unless stipulated to the contrary (e.g., $C_7$–$C_{10}$ alkylphenyloxy) "phenyl" is intended to encompass the monovalent radical $C_6$–$H_5$— as well as the halogen-substituted (Cl, Br, F and I) and alkyl-substituted ($C_1$–$C_3$) homologs thereof, up to 3 substituent groups per phenyl radical. The halogen substituents are preferred for their flame retardant and bacteriostatic properties, but no economic purpose is served by, e.g., tetra-substitution. Use of more than 3 alkyl substituents can create steric problems and, in fact, when as many as 3 are employed, they are desirably restricted to methyl.

The acyloxy functions can be conveniently introduced into the first reactant by reacting an appropriate organic acid anhydride, e.g., acetic anhydride, with the corresponding hydroxy or alkoxy silane with concomitant elimination of an organic acid or an ester. The reaction is desirably catalyzed with a few drops of a mineral acid. Generally, two moles of anhydride are employed per mole of di-hydroxy, hydroxy-alkoxy, or di-alkoxy silane so as to provide one acyloxy function for condensation with the second reactant in forming the "five-member" structure, and another for chain propagation. The provision at this stage of three or more acyloxy functions on a given silane is not preferred, inasmuch as premature cross-linking during propagation of the polysiloxane chains could be caused thereby.

The second reactant, which contributes the central silicon to the "five-member" structure, is a silane bearing at least two and preferably three or more alkoxy and/or hydroxy groups. Where the second reactant carries more than two such groups, the groups remaining after formation of the "five-member" chain are available for cross-linking in the penultimate polysiloxane. Hydroxy groups on the second reactant are far more reactive than the alkoxys, and preferentially react in forming the "five-member" chain. Thus, where no more than two hydroxys are borne by the second reactant, they are consumed in forming the "five-member" chain and premature availability of pendant hydroxys on the penultimate polysiloxane is avoided. Where the second reactant is, e.g., di-hydroxy or di-alkoxy so that additional functions are not provided for subsequent cross-linking, such functions can be introduced into the "five-member" chain by appropriate selection of the first reactant. Accordingly, then, the second reactant is selected from the group consisting of (1) a di-, tri-, or tetra-alkoxy silane (2) a di-hydroxy silane or (3) a hydroxy-alkoxy silane which is mono-, di- or tri-alkoxy and mono- or di-hydroxy; remaining valences of the silanes (1–3) being independently satisfied from the group consisting of hydrogen, phenyl, $C_1$–$C_4$ alkyl, $C_7$–$C_{10}$ alkylphenyloxy, phenyloxy or

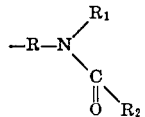

as described above. Use of the last-mentioned radical in either the first or second reactant has been discovered to provide unusually hard and solvent-resistant films, particularly where the preferred gamma-acetamidopropyl radical is incorporated in the polymer. The acetamidoalkyl radical can be contained in one or the other of the first or second reactants or both, but preferably, it is incorporated by way of the second reactant alone.

With regard to both the first and second reactants for the "five-member" structure, alkoxy, and acyloxy radicals are preferably those containing not more than 4 carbon atoms, most preferably not more than 2, so as to facilitate byproduct removal. It is also preferred, particularly with regard to the first reactant, to occupy at least one silane valence with a relatively inert radical such as alkyl or phenyl so as to reduce the opportunity for occasional cross-reaction between identical reactants.

The reaction of the first and second reactants to form the "five-member" structure proceeds in a straightforward fashion, and the reaction mixture is subjected to moderate heating primarily to drive off relatively volatile ester and/or organic acid byproducts.

Propagation of the "five-member" structure to form the penultimate polysiloxane occurs by hydrolysis of the di-terminal acyloxy functions to form highly reactive hydroxy groups. Upon formation of such groups, condensation between one terminal hydroxy and another proceeds to propagate the polysiloxane chain.

Hydrolysis of the di-terminal acyloxy groups can be effected either before or after the penultimate polysiloxane is applied to the substrate. In either case, it is usually desirable to reduce the viscosity of the siloxane by the addition of an inert solvent such as ethyl acetate or the like. Suitable solvents can be selected by the art-skilled from, e.g., commonly available ethers, furanes, hydrocarbons, and aromatics, as can be proportions appropriate to the achievement of any desired viscosity and film thickness. Preferred film thicknesses after cure range about 5 microns for most applications.

Before application of the siloxane to the substrate, hydrolysis and chain propagation can be instituted by the addition of e.g., acetone and water to the reaction mixture. By this expedient, the viscosity of the flow-coating mixture is increased somewhat, whereupon thicker coatings can be readily achieved where desired. Alternatively, hydrolysis can be achieved after coating by the simple exposure of the coated substrate to atmospheric moisture.

Following hydrolysis and application to the substrate, or vice-versa, the substrate bears a substantially uncross-linked, linear polysiloxane coating. This coating is then desirably cross-linked to a hard, transparent film by holding the coated substrate at an elevated temperature, e.g., from about 65° C. to less than about 150° C. for a time sufficient to achieve cross-linking through, e.g., hydrolysis and condensation of pendant alkoxy functions. Cross-linking can be augmented by inclusion of a tri-acyloxy silane bond—satisfied with $C_1$–$C_4$ alkyl, phenyl or hydrogen in the flow-coating mixture after formation of the "five-member" chain but prior to hydrolysis. Upon hydrolysis, the hydrolyzed tri-functional silane is incorporated in the polysiloxane chain and presents a reactive hydroxy group for cross-linking by branch formation. The said tri-acyloxy silane is preferably employed in the proportion of about 5 to 25% by weight of the total tri-acyloxy silane-"five-member" chain mixture (non-diluted basis).

As employed herein, the term "normally vulnerable substrate" has reference to metal, glass and plastic substrates normally subject to attack by solvents, corrosive attack such as by water vapor or acid or alkaline solutions or to mechanical attack as by abrasion. Included as normally vulnerable substrates are rigid transparent dielectric materials such as glass and plastic e.g., polymethyl methacrylate. Other rigid substrates include those having metallic surfaces such as bright metals employed architecturally, e.g., brass, copper, bronze and aluminum, and vacuum-deposited metals employed for conductive purposes such as active elements in printed circuits and transparent area electrodes in electroluminescent panels, e.g., copper, silver, platinum and gold. Flexible substrates can be employed as well. For example, where it is desired to secure the advantages of the polysiloxane coating to rigid substrates without necessitating undue down-time with the equipment containing the substrate, e.g., the canopy of a warplane in a combat zone, the coatings of the invention can be carried by a flexible plastic substrate film, which latter can be facilely laminated to the article to be protected. Typical flexible plastics suitable for the use last-mentioned include transparent films, e.g., cellulose acetate, polyester terephthalate films such as Du Pont's "Mylar" or Celanese Corporation's "Celanar," tetrafluoroethylene films such as Du Pont's TFE and FEP "Teflon" resins and the like.

In the examples of the preferred embodiments which follow, the polymethyl methacrylate substrate has been biaxially stretched to enhance shatter resistance, then ground and polished. When polymethyl methacrylate is coated "as cast," it has been found desirable to first apply a primer coat, e.g., a melamine-acrylic thermosetting resin. In general, pre-coating surface treatments conventional in organo-silicone coating can be employed with and are within the compass of the instant invention.

EXAMPLE 1

Two moles of methyl triethoxy silane and four moles of acetic anhydride containing three drops of concentrated sulfuric acid are heated to reflux in a flask equipped with a fractionating column. The rate of heat input is adjusted to maintain the take-off temperature at the top of the column at 76–80° C. while a total of 3.95 moles of byproduct ethyl acetate is distilled from the reaction vessel.

One mole of gamma-acetamidopropyl triethoxy silane is added to the reaction vessel and heating continued as above until 1.95 moles of ethyl acetate has been distilled from the vessel.

The product remaining in the reaction vessel is dissolved in an equal weight of ethyl acetate then filtered. A portion of this solution is flowed over a sheet of biaxially stretched polymethyl methacrylate and the flow-coated sheet is exposed to atmospheric moisture for ten minutes. The sheet is then heated in an oven at 80° C. for 18 hours to effect final cure of the silicone coating.

A hard, transparent silicone coating thus formed had the following characteristics:

(a) Resistance to attack by methylene chloride for 60 minutes. This was the amount of time a methylene chloride soaked tissue had to be held in intimate contact with the coating before visible damage was done.

(b) Resistance to attack by acetone for 45 minutes.

(c) Resistance to attack by methyl ethyl ketone for 140 minutes.

(d) Abrasion resistance of the coating was measured by ASTM method 1092.1. A Tabor Abraser equipped with CS–10 Calibrase wheels and a 1000 g. load on each wheel was run for 100 turns. Light transmission loss due to this procedure was only 14–16% (from 91% down to 77% transmission).

EXAMPLE 2

Two moles of tetraethyl orthosilicate (tetraethoxy silane) and four moles of acetic anhydride containing three drops of concentrated sulfuric acid are treated as in Example 1 above until 3.96 moles of byproduct ethyl acetate has been distilled from the reaction vessel. Then one mole of gamma-acetamidopropyl triethoxy silane is added to the vessel and distillation continued until 1.95 moles of byproduct ethyl acetate has come over.

The light yellow product is diluted with an equal weight of ethyl acetate, filtered and used as a coating solution for biaxially stretched polymethyl methacrylate as in Example 1 above. Final cure of the coating is accomplished by heating 10 hours at 80° C.

A cured coating thus formed was transparent and free from distortions. It was tested for solvent resistance in the same manner as the coating of Example 1. It resisted attack by methylene chloride for 105 minutes and acetone and methyl ethyl ketone for more than 300 minutes.

Hardness, as tested by ASTM 1092.1 and defined by loss of light transmission was 5.5% loss (from 91% to 86% transmission).

EXAMPLE 3

In the same manner as in Examples 1 and 2, two moles of methyl triethoxy silane are reacted with four moles of acetic anhydride to yield 3.95 moles of byproduct ethyl acetate. Then one mole of tetraethyl orthosilicate is added to the vessel and 1.95 moles of ethyl acetate distilled out. The light yellow product is diluted with an equal weight of ethyl acetate and this solution used to coat a sheet of biaxially stretched polymethyl methacrylate as in the above example. Cure procedure was the same as in Example 2. A coating thus formed was hard and transparent.

EXAMPLE 4

Fifty grams of the acyloxy silane-alkoxy silane reaction product of Example 1 is mixed with 17 g. of methyl triacetoxy silane. The mixture is dissolved in 67 g. of ethyl acetate and this solution used to coat biaxially stretched polymethyl methacrylate as in the previous example. Final cure was at 80° C. for 18 hours. A coating thus formed had a light transmission loss of only 11% (from 91% to 81%), resisted attack by methylene chloride for 45 minutes, by acetone for 105 minutes and by methyl ethyl ketone for 180 minutes.

EXAMPLE 5

Fifty grams of the acyloxy silane-alkoxy silane reaction product of Example 1 is pre-hydrolyzed by mixture with 50 g. of an acetone solution containing 8% by weight of water. An immediate 10° C. rise in temperature of the solution is observed. After cooling to ambient temperature the solution is used to coat biaxially stretched polymethyl methacrylate as in Example 1. Cure at 80° C. for 18 hours gives a coating essentially the same as that in Example 1 with regard to both solvent resistance and hardness.

EXAMPLE 6

Two moles of methyl triethoxy silane is reacted with four moles of acetic anhydride to give 3.95 moles of byproduct ethyl acetate in the same manner as in Example 1. One mole of phenyl triethoxy silane is added to the reaction vessel and heating continued until 1.95 moles of byproduct ethyl acetate is distilled out of the vessel.

The product is diluted with an equal weight of ethyl acetate and used to coat biaxially stretched polymethyl methacrylate as in the above examples. Cure of a product thus formed at 80° C. for 18 hours gave a clear film which lost only 30% light transmission when tested according to ASTM 1092.1.

EXAMPLE 7

Two moles of tetraethyl orthosilicate and four moles of acetic anhydride is reacted as in Example 2 to yield 3.98 moles of byproduct ethyl acetate. Then one mole of gamma-trifluoroacetamidopropyl triethoxy silane is added and 1.95 moles of byproduct ethyl acetate distilled from the vessel.

The reaction product is diluted with an equal weight of ethyl acetate and this solution used to coat biaxially stretched polymethyl methacrylate as in previous examples. After an 18 hour cure at 80° C. a transparent coating thus formed resisted attack by methylene chloride for more than seven hours, by acetone for four and one-half hours and methyl ethyl ketone for more than seven hours. The coating lost only 10% light transmission after 100 turns on the Tabor Abraser used in accordance with ASTM 1092.1 test procedures.

I claim:

1. A compound having the structure

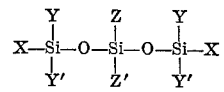

wherein X is $C_1$–$C_4$ acyloxy and Y, Y', Z and Z' are independently selected from the group consisting of hydrogen, $C_1$–$C_4$ alkyl, $C_1$–$C_4$ alkoxy, phenyl, $C_7$–$C_{10}$ alkylphenyloxy, phenyloxy, and an amide group of structure:

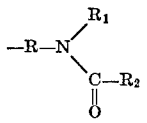

wherein R is $C_1$–$C_4$ alkylene, $R_2$ is halogen substituted or unsubstituted $C_1$–$C_4$ alkyl, and $R_1$ is independently $R_2$ or hydrogen, with the proviso that at least one of Y, Y', Z and Z' is $C_1-C_4$ alkoxy and at least one of Y', Y, Z, and Z' is said amido group.

2. A compound according to claim 1 wherein when either of Z or Z' is said amido group, Y and Y' are not.

3. A compound according to claim 1 wherein Y and Y' are independently selected from the group consisting of $C_1-C_4$ alkyl and $C_1-C_4$ alkoxy; and wherein Z and Z' are independently selected from the group consisting of $C_1-C_4$ alkyl, $C_1-C_4$ alkoxy and gamma-acetamidopropyl, all with said proviso.

4. A compound according to claim 1 wherein X is acetoxy, Y is methyl or ethoxy, Y' is ethoxy, Z' is ethoxy and Z is gamma-acetamidopropyl.

5. A compound according to claim 1 wherein Y, Y', and Z are ethoxy, X is acetoxy and Z' is gamma-trifluoroacetamidopropyl.

6. A compound according to claim 1 wherein Y, Y', and Z are ethoxy, X is acetoxy and Z' is gamma-acetamidopropyl.

7. A compound of structure

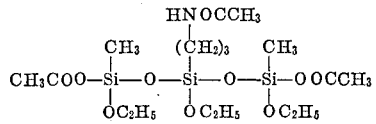

8. The process which comprises reacting a first reactant:
(a) diacyloxy silane wherein remaining valences of said silane are independently satisfied from the group consisting of hydrogen, $C_1-C_4$ alkoxy, $C_1-C_4$ alkyl, $C_7-C_{10}$ alkylphenyloxy, phenyloxy and phenyl, the acyloxy portions of said silane yielding upon condensation with reactant (b) byproducts boiling below about 180° C.; with a second reactant (b) selected from the group consisting of (1) di- or tri-alkoxy silane, (2) di-hydroxy silane, or (3) a hydroxy-alkoxy silane which is mono- or di-hydroxy mono- or di-alkoxy; the remaining valences of silanes (1–3) being independently satisfied from the group consisting of hydrogen, phenyl, $C_1-C_4$ alkyl, $C_7-C_{10}$ alkylphenyloxy, phenyloxy, and an amido group of structure:

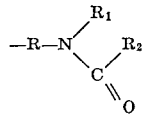

wherein R is $C_1-C_4$ alkylene, $R_2$ is halogen substituted or unsubstituted $C_1-C_4$ alkyl, and $R_1$ is independently $R_2$ or hydrogen; the alkoxy groups of silanes (1) and (3) containing from 1 to 4 carbon atoms; at least one valence of silanes (1–3) being said amido group.

9. The process of claim 8 wherein about 2 moles of said first reactant are reacted for each mole of said second reactant to form an acyloxy-di-terminated siloxane.

10. The process which comprises reacting about two moles of methyl diacyloxy ethoxy silane with one mole of gamma-acetamidopropyl triethoxy silane to form an acyloxy di-terminated silane.

References Cited
UNITED STATES PATENTS

| | | | |
|---|---|---|---|
| 2,910,496 | 10/1959 | Bailey et al. | 260—448.8 R |
| 3,356,758 | 12/1967 | Omietanski et al. | 260—448.2 B |
| 2,973,383 | 2/1961 | Black | 260—448.8 R X |
| 3,068,152 | 12/1962 | Black | 260—448.8 R X |
| 3,288,754 | 11/1966 | Green | 260—448.8 R X |
| 3,440,261 | 4/1969 | Saam | 260—448.8 R X |
| 3,494,951 | 2/1970 | Berger | 260—448.8 R X |
| 3,455,940 | 7/1969 | Stecker | 260—448.8 R X |

DANIEL E. WYMAN, Primary Examiner

P. F. SHAVER, Assistant Examiner

U.S. Cl. X.R.

106—287 SB; 117—135.1; 260—46.5 E, 46.5 R